(12) United States Patent
Wang

(10) Patent No.: US 10,181,976 B2
(45) Date of Patent: Jan. 15, 2019

(54) SYSTEM AND METHOD OF ADJUSTING DATA COLLECTION FREQUENCY

(71) Applicant: INSTITUTE FOR INFORMATION INDUSTRY, Taipei (TW)

(72) Inventor: Ping-Feng Wang, Taipei (TW)

(73) Assignee: INSTITUTE FOR INFORMATION INDUSTRY, Taipei (TW)

(*) Notice: Subject to any disclaimer, the term of this patent is extended or adjusted under 35 U.S.C. 154(b) by 182 days.

(21) Appl. No.: 15/016,493

(22) Filed: Feb. 5, 2016

(65) Prior Publication Data
US 2017/0222866 A1    Aug. 3, 2017

(30) Foreign Application Priority Data

Feb. 1, 2016 (TW) .............................. 105103162 A

(51) Int. Cl.
*H04L 29/08* (2006.01)
*H04L 12/24* (2006.01)

(52) U.S. Cl.
CPC ........ *H04L 41/069* (2013.01); *H04L 41/0681* (2013.01); *H04L 67/12* (2013.01); *H04L 67/2819* (2013.01)

(58) Field of Classification Search
CPC .................................................... H04L 41/069
USPC ........................................................ 709/224
See application file for complete search history.

(56) References Cited

U.S. PATENT DOCUMENTS

| | | | |
|---|---|---|---|
| 8,427,309 B2 | 4/2013 | Bullard et al. | |
| 8,432,288 B2 | 4/2013 | Bullard et al. | |
| 9,432,271 B2 | 8/2016 | Bullard et al. | |
| 2013/0282281 A1 | 10/2013 | Hayot | |
| 2015/0185054 A1* | 7/2015 | Hesch | G01D 9/005 702/187 |

FOREIGN PATENT DOCUMENTS

CN     102461071 A     5/2012

OTHER PUBLICATIONS

Examination Report issue is corresponding Taiwan patent application No. 105103162 dated Apr. 20, 2017.

* cited by examiner

Primary Examiner — Adnan M Mirza
(74) Attorney, Agent, or Firm — McClure, Qualey & Rodack, LLP

(57) ABSTRACT

The present disclosure provides a system and a method of adjusting data collection frequency. the system includes a server, a gateway and a sensor. The gateway is communicated with the server for data transmission. The sensor is configured to transmit the sensor data to the gateway, wherein the gateway transmits the sensor data to the server based on a first frequency, and is triggered to transmit the sensor data and a historical sensor data based on a second frequency in case the server or the gateway detects an alert event when processing the sensor data, wherein the historical sensor data is related to the alert event, so that the server analyzes the historical sensor data to get a diagnostics on the alert event, wherein the second frequency is higher than the first frequency.

8 Claims, 2 Drawing Sheets

SYSTEM AND METHOD OF ADJUSTING DATA COLLECTION FREQUENCY

RELATED APPLICATION LICATIONS

This application claims priority to Taiwan Application Serial Number 105103162, filed Feb. 1, 2016, which is herein incorporated by reference.

BACKGROUND

Field of Invention

The present invention relates to data collection technology. More particularly, the present invention relates to systems and methods of adjusting data collection frequency.

Description of Related Art

With the development of the wisdom network, various sensors are built in one or more ranges to collect more data. However, most of the data detected by the sensor is not required, there needs a lot of network bandwidth and storage space for storing the data.

Since system load, data transmission, and record costs are considered, the frequency as to data collection is limited and is no flexibility. However, once an event occurs, because the data are collected with a low frequency, these data cannot be used in further analysis.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

According to embodiments of the present disclosure, the present disclosure provides a system and a method of adjusting data collection frequency to solve or circumvent aforesaid problems and disadvantages.

In one aspect, the system includes a server, a gateway and a sensor. The gateway is communicated with the server for data transmission. The sensor is configured to transmit the sensor data to the gateway, wherein the gateway transmits the sensor data to the server based on a first frequency, and is triggered to transmit the sensor data and a historical sensor data based on a second frequency in case the server or the gateway detects an alert event when processing the sensor data, wherein the historical sensor data is related to the alert event, so that the server analyzes the historical sensor data to get a diagnostics on the alert event, wherein the second frequency is higher than the first frequency.

In one embodiment, the gateway includes a storage device and a controller. The storage device has a data buffer. The controller is configured to set a maximum frequency of capturing the sensor data from the sensor by the gateway, and to set a size of the data buffer, wherein the historical sensor data previously transmitted from the sensor is stored in the data buffer.

In one embodiment, the server includes a storage device and a processor. The storage device is configured to store an alert event data frequency profile comprising information on the sensor associated with the alert event, the second frequency of collecting the historical sensor data and a predetermined time range. The processor is configured to find the sensor associated with the alert event by using the alert event data frequency profile when detecting the alert event and to send an alert event data acquisition command to the controller of the gateway connected to the sensor, so that the controller increases a receiving frequency of capturing the sensor data from the sensor and transmits the historical sensor data based on the second frequency during the predetermined time range before and after the occurrence time of the alert event to the server for getting the diagnostics.

In one embodiment, the storage device of the gateway stores an alert event data frequency profile comprising information on the sensor associated with the alert event, the second frequency of collecting the historical sensor data and a predetermined time range, wherein the controller finds the sensor associated with the alert event by using the alert event data frequency profile when detecting the alert event, increases a receiving frequency of capturing the sensor data from the sensor and transmits the historical sensor data based on the second frequency during the predetermined time range before and after the occurrence time of the alert event to the server for getting the diagnostics.

In one embodiment, the alert event data frequency profile further comprises information on a monitoring time, the server waits for the monitoring time after the alert event occurs and then sends a normal event data acquisition command to the gateway, so that the gateway transmits the sensor data based on the first frequency to the server.

In another aspect, the method includes steps of (a) configuring a gateway to receive a sensor data from a sensor, and to transmit the sensor data to a server based on a first frequency; (b) configuring the server or the gateway to process the sensor data to detect an alert event; (c) in case the alert event is detected, a historical sensor data related to the alert event is transmitted to the server based on a second frequency from the gateway, so that the historical sensor data is analyzed by the server to get a diagnostics on the alert event, wherein the second frequency is higher than the first frequency.

In one embodiment, the method further includes a step of configuring a controller of a gateway to set a maximum frequency of capturing the sensor data from the sensor by the gateway, and to set a size of a data buffer, wherein the historical sensor data transmitted previously from the sensor is stored in the data buffer.

In one embodiment, the method further includes a step of configuring the server to preload an alert event data frequency profile comprising information on the sensor associated with the alert event, the second frequency of collecting the historical sensor data and a predetermined time range, wherein the step (c) includes: when the server detects the alert event, finding the sensor associated with the alert event by using the alert event data frequency profile, and sending an alert event data acquisition command to the controller of the gateway connected to the sensor, so that the controller increases a receiving frequency of capturing the sensor data from the sensor and transmits the historical sensor data based on the second frequency during the predetermined time range before and after the occurrence time of the alert event to the server for getting the diagnostics.

In one embodiment, the method further includes a step of configuring the gateway to preload an alert event data frequency profile comprising information on the sensor associated with the alert event, the second frequency of collecting the historical sensor data and a predetermined time range, wherein the step (b) includes: when the controller detects the alert event, finding the sensor associated with the alert event by using the alert event data frequency profile, increasing a receiving frequency of capturing the sensor data from the sensor, and transmitting the historical sensor data based on the second frequency during the predetermined time range before and after the occurrence time of the alert event to the server for getting the diagnostics.

In one embodiment, the alert event data frequency profile further comprises information on a monitoring time, and the method further includes a step of configuring the server to wait for the monitoring time after the alert event occurs and then to send a normal event data acquisition command to the gateway, so that the gateway transmits the sensor data based on the first frequency to the server.

In view of the foregoing, according to embodiments of the present disclosure, the historical sensor data usually stored in the gateway are extracted in high frequency and long period for further analysis, thereby reducing storage space and transmission bandwidth of network.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein.

DETAILED DESCRIPTION

Figure 1:
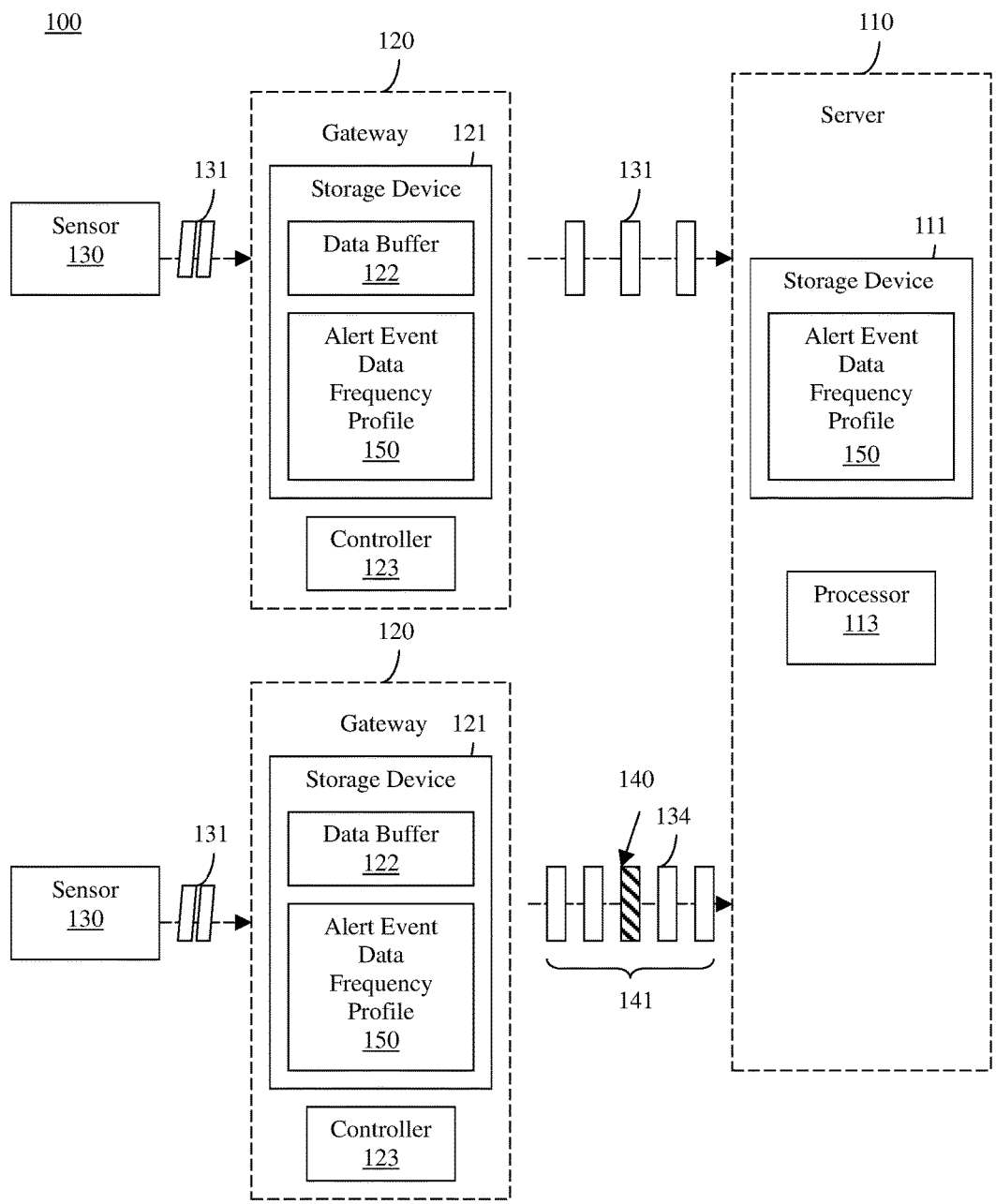
FIG. 1 is a block diagram of a system of adjusting data collection frequency according to one embodiment of the present disclosure.

In the following detailed description, for purposes of explanation, numerous specific details are set forth in order to attain a thorough understanding of the disclosed embodiments. In accordance with common practice, like reference numerals and designations in the various drawings are used to indicate like elements/parts. Moreover, well-known elements or method steps are schematically shown or omitted in order to simplify the drawing and to avoid unnecessary limitation to the claimed invention.

In the detailed embodiment and the claims, unless otherwise indicated, the article "a" or "the" refers to one or more than one of the word modified by the article "a" or "the."

Through the present specification and the annexed claims, the description involving the "electrical connection" refers to the cases where one component is electrically connected to another component indirectly via other component(s), or one component is electrically connected to another component directly without any other component.

FIG. 1 is a block diagram of a system 100 of adjusting data collection frequency according to one embodiment of the present disclosure. As illustrated in FIG. 1, the system 100 includes a server 110, a gateway 120 and a sensor 130. The gateway 120 is communicated with the server 110 for data transmission. The sensor 130 is configured to transmit the sensor data 131 (e.g., stream sensor data) to the gateway 120, and the gateway 120 is transmits the sensor data 131 based on a first frequency (e.g., low frequency) to the server 110. The gateway 120 is triggered to transmit the sensor data and a historical sensor data based on a second frequency (e.g., high frequency) in case the server 110 or the gateway 120 detects an alert event when processing the sensor data. The historical sensor data 134 is related to the alert event, so that the server 110 analyzes the historical sensor data to get a diagnostics on the alert event, where the second frequency is higher than the first frequency.

In one embodiment, the gateway 120 includes a storage device 121 (e.g., a flash memory, a hard disk, or the like) and a controller 123 (e.g., a micro-controller unit, a central process unit, or the like). The storage device 121 has a data buffer 122. The controller 123 is configured to set a maximum frequency of capturing the sensor data from the sensor 130 by the gateway 120, and to set a size of the data buffer 122, wherein the historical sensor data 134 previously transmitted from the sensor 130 is stored in the data buffer 122.

In one embodiment, the server 110 includes a storage device 111 (e.g., a hard disk) and a processor 113 (e.g., a central process unit). The storage device 111 is configured to store an alert event data frequency profile 150 including information on one or various sensors 130 associated with different alert events, the second frequency of collecting the historical sensor data 134 and a predetermined time range 141 (e.g., two hours before the alert event and one hour after the alert event). The processor 113 is configured to find the sensor 130 associated with the alert event by using the alert event data frequency profile 150 when detecting the alert event and to send an alert event data acquisition command to the controller 123 of the gateway 120 connected to the sensor 130, so that the controller 123 increases a receiving frequency of capturing the sensor data from the sensor 130, where the receiving frequency is not higher than abovementioned maximum frequency. Moreover, the controller 123 transmits the historical sensor data 134 based on the second frequency during the predetermined time range 141 before and after the occurrence time 140 of the alert event to the server 110 for getting the diagnostics.

In an alternative embodiment, the storage device 121 of the gateway 120 stores an alert event data frequency profile 150. The controller 123 finds the sensor 130 associated with the alert event by using the alert event data frequency profile 150 when detecting the alert event, and increases the receiving frequency of capturing the sensor data from the sensor, where the receiving frequency is not higher than abovementioned maximum frequency. Moreover, the controller 123 transmits the historical sensor data based on the second frequency during the predetermined time range 141 before and after the occurrence time 140 of the alert event to the server 110 for getting the diagnostics.

In one embodiment, the alert event data frequency profile 150 further comprises information on a monitoring time, the server 110 waits for the monitoring time after the alert event occurs and then sends a normal event data acquisition command to the gateway 120, so that the gateway 120 transmits the sensor data based on the first frequency to the server.

Figure 2:
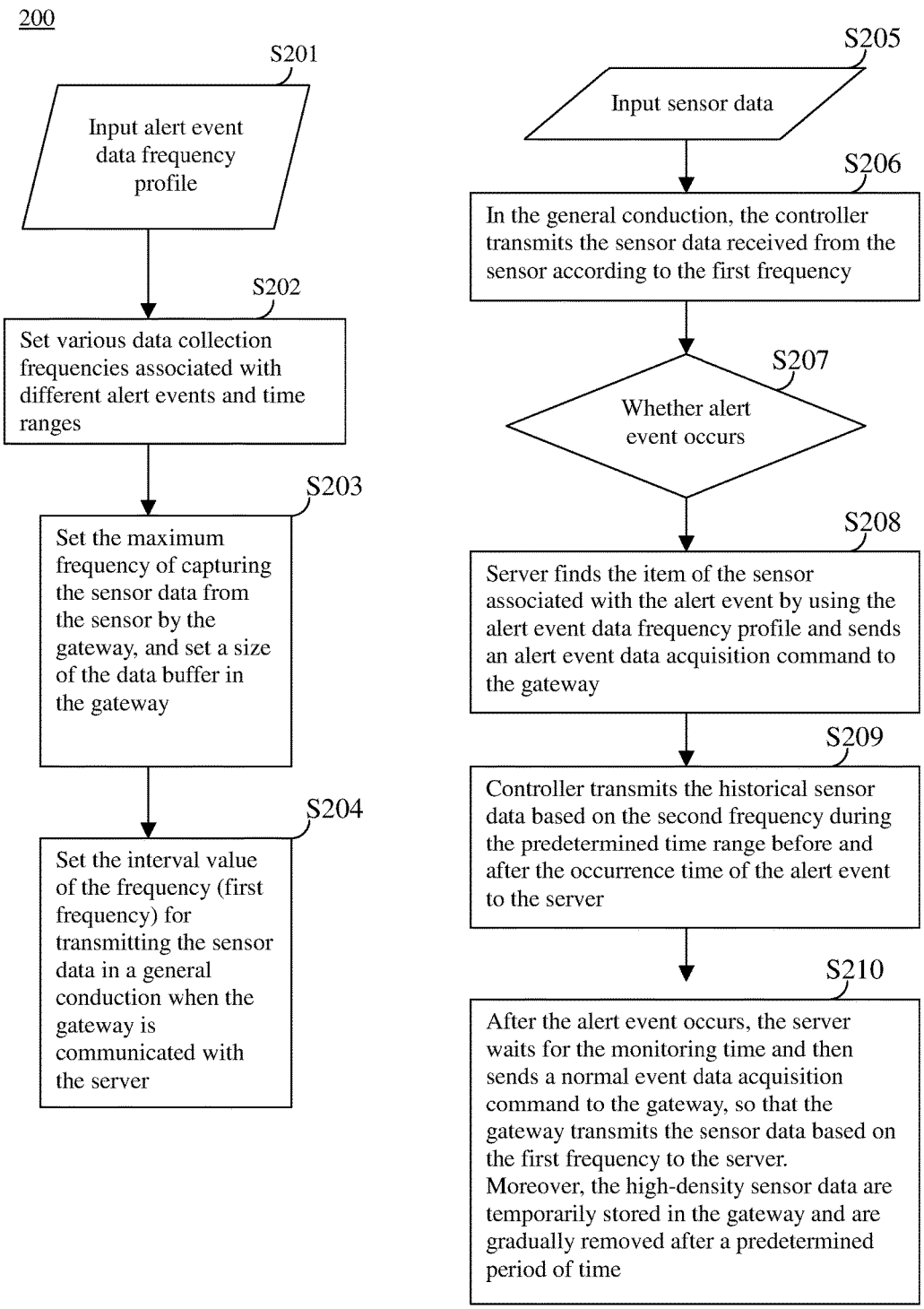
FIG. 2 is a flow chart illustrating a method of adjusting data collection frequency according to one embodiment of the present disclosure.

For a more complete understanding of a method performed by the system 100 for adjusting data collection frequency, refer to FIG. 2. FIG. 2 is a flow chart illustrating a method 200 of adjusting data collection frequency according to one embodiment of the present disclosure. As illustrated in FIG. 2, the online learning style automated diagnostic method 200 includes the operations S201-S210. However, as could be appreciated by persons having ordinary skill in the art, for the steps described in the present embodiment, the sequence in which these steps is performed, unless explicitly stated otherwise, can be altered depending on actual needs; in certain cases, all or some of these steps can be performed concurrently. With reference to FIGS. 1 and 2, some embodiments are explanted below.

Operations S201-S204 are directed to pre-setting. Operations S205-S210 are directed to adjust data collection frequency after the pre-setting.

In operation S201, a user inputs the alert event data frequency profile 150 into the server 110. In one embodiment, the server 110 can sync the alert event data frequency profile 150 to the gateway 120.

In operation S202, the server 110 or the gateway 120 can set various data collection frequencies associated with different alert events and time ranges (e.g., two hours before the alert event and one hour after the alert event).

In operation S203, the controller 123 is configured to set the maximum frequency of capturing the sensor data from the sensor 130 by the gateway 120, and the controller 123 is configured to set a size of the data buffer 122 in the gateway 120.

In operation S204, the controller 123 is configured to set the interval value of the frequency (i.e., abovementioned first frequency) for transmitting the sensor data in a general conduction when the gateway 120 is communicated with the server 110.

In operation S205, the sensor 130 transmits the sensor data 131.

In operation S206, when the server 110 does not detect the alert event (i.e., the general conduction), the controller 123 transmits the sensor data received from the sensor 130 according to the first frequency, so as to maintain normal monitoring.

In operation S207, the server 110 executes an event detection processing on the sensor data, so as to determine whether the alert event occurs.

In operation S208, when the alert event occurs, the server 110 finds the item of the sensor 130 associated with the alert event by using the alert event data frequency profile 150 and sends an alert event data acquisition command to the controller 123 of the gateway 120 related to the item of the sensor 130.

In operation S209, the controller 123 transmits the historical sensor data 134 based on the second frequency (high frequency) during the predetermined time range 141 before and after the occurrence time 140 of the alert event to the server 110. Moreover, the controller 123 increases the receiving frequency of capturing the sensor data from the sensor 130.

In operation S210, after the alert event occurs, the server 110 waits for the monitoring time and then sends a normal event data acquisition command to the gateway 120, so that the gateway 120 transmits the sensor data based on the first frequency to the server. Moreover, the high-density sensor data are temporarily stored in the gateway 120 and are gradually removed after a predetermined period of time.

In practice, in one embodiment, the system 100 and/or the method 200 may be applied in the diagnostic detection of operating units of a wisdom factory. Based on vibration analysis, oil analysis, infrared temperature analysis noise and acoustic analysis, nondestructive testing technology methods and so forth, detection rules are formulated and aimed at functional failure assessment targets. Therefore, the detection rules of each analysis method can defines related alert events, various sensing projects collected for individual event analysis, and required data frequency, time range before and/or after the occurrence time of the alert event.

In one alert event related to shake, information on rotor systems, bearing systems, gear systems, rotors, vibration sensors and so forth can be collected to analyze the failure. Based on data collection frequency, the data during the time range before and after the occurrence time of the alert event can collected for further failure analysis.

In view of the foregoing, according to embodiments of the present disclosure, the historical sensor data usually stored in the gateway are extracted in high frequency and long period for further analysis, thereby reducing storage space and transmission bandwidth of network.

Although various embodiments of the invention have been described above with a certain degree of particularity, or with reference to one or more individual embodiments, they are not limiting to the scope of the present disclosure. Those with ordinary skill in the art could make numerous alterations to the disclosed embodiments without departing from the spirit or scope of this invention. Accordingly, the protection scope of the present disclosure shall be defined by the accompany claims.

What is claimed is:

1. A system of adjusting data collection frequency, comprising:
   a server;
   a gateway communicated with the server for data transmission; and
   a sensor configured to transmit a sensor data to the gateway,
   wherein the gateway transmits the sensor data to the server based on a first frequency, and is triggered to transmit the sensor data and a historical sensor data based on a second frequency in case the server or the gateway detects an alert event when processing the sensor data, wherein the historical sensor data is related to the alert event, so that the server analyzes the historical sensor data to get a diagnostics on the alert event, wherein the second frequency of the data transmission of the gateway is higher than the first frequency of the data transmission of the gateway,
   wherein the gateway comprises:
   a storage device having a data buffer; and
   a controller configured to set a maximum frequency of capturing the sensor data from the sensor by the gateway, and to set a size of the data buffer, wherein the historical sensor data previously transmitted from the sensor is stored in the data buffer of the gateway, and each of the first frequency and the second frequency is not higher than the maximum frequency,
   wherein the server comprises:
   a storage device configured to store an alert event data frequency profile comprising information on the sensor associated with the alert event, the second frequency of collecting the historical sensor data and a predetermined time range; and
   a processor configured to find the sensor associated with the alert event by using the alert event data frequency profile when detecting the alert event and to send an alert event data acquisition command to the controller of the gateway connected to the sensor, so that the controller increases a receiving frequency of capturing the sensor data from the sensor and transmits the historical sensor data based on the second frequency during the predetermined time range before and after the occurrence time of the alert event to the server for getting the diagnostics.

2. The system of claim 1, wherein the alert event data frequency profile further comprises information on a monitoring time, the server waits for the monitoring time after the alert event occurs and then sends a normal event data acquisition command to the gateway, so that the gateway transmits the sensor data based on the first frequency to the server.

3. The system of claim 1, wherein the storage device of the gateway stores an alert event data frequency profile comprising information on the sensor associated with the alert event, the second frequency of collecting the historical sensor data and a predetermined time range, wherein the controller finds the sensor associated with the alert event by using the alert event data frequency profile when detecting the alert event, increases a receiving frequency of capturing the sensor data from the sensor and transmits the historical sensor data based on the second frequency during the predetermined time range before and after the occurrence time of the alert event to the server for getting the diagnostics.

4. The system of claim 2, wherein the alert event data frequency profile further comprises information on a monitoring time, the server waits for the monitoring time after the alert event occurs and then sends a normal event data acquisition command to the gateway, so that the gateway transmits the sensor data based on the first frequency to the server.

5. A method for adjusting data collection frequency, comprising steps of:
configuring a controller of a gateway to set a maximum frequency of capturing a sensor data from a sensor by the gateway, and to set a size of a data buffer of the gateway, wherein a historical sensor data transmitted previously from the sensor is stored in the data buffer of the gateway;
(a) configuring the gateway to receive the sensor data from the sensor, and to transmit the sensor data to a server based on a first frequency;
(b) configuring the server or the gateway to process the sensor data to detect an alert event;
(c) in case the alert event is detected, the historical sensor data related to the alert event is transmitted to the server based on a second frequency from the gateway, so that the historical sensor data is analyzed by the server to get a diagnostics on the alert event, wherein the second frequency of data transmission of the gateway is higher than the first frequency of data transmission of the gateway, and each of the first frequency and the second frequency is not higher than the maximum frequency, and
(d) configuring the server to preload an alert event data frequency profile comprising information on the sensor associated with the alert event, the second frequency of collecting the historical sensor data and a predetermined time range,
wherein the step (c) comprises: when the server detects the alert event, finding the sensor associated with the alert event by using the alert event data frequency profile, and sending an alert event data acquisition command to the controller of the gateway connected to the sensor, so that the controller increases a receiving frequency of capturing the sensor data from the sensor and transmits the historical sensor data based on the second frequency during the predetermined time range before and after the occurrence time of the alert event to the server for getting the diagnostics.

6. The method of claim 5, wherein the alert event data frequency profile further comprises information on a monitoring time, and the method further comprises:
configuring the server to wait for the monitoring time after the alert event occurs and then to send a normal event data acquisition command to the gateway, so that the gateway transmits the sensor data based on the first frequency to the server.

7. The method of claim 5, further comprising:
configuring the gateway to preload an alert event data frequency profile comprising information on the sensor associated with the alert event, the second frequency of collecting the historical sensor data and a predetermined time range,
wherein the step (c) comprises: when the controller detects the alert event, finding the sensor associated with the alert event by using the alert event data frequency profile, increasing a receiving frequency of capturing the sensor data from the sensor, and transmitting the historical sensor data based on the second frequency during the predetermined time range before and after the occurrence time of the alert event to the server for getting the diagnostics.

8. The method of claim 7, wherein the alert event data frequency profile further comprises information on a monitoring time, and the method further comprises:
configuring the server to wait for the monitoring time after the alert event occurs and then to send a normal event data acquisition command to the gateway, so that the gateway transmits the sensor data based on the first frequency to the server.

* * * * *